United States Patent
Howard et al.

(10) Patent No.: US 7,081,730 B1
(45) Date of Patent: Jul. 25, 2006

(54) MOTOR CONTROLLER SYSTEM FOR LARGE DYNAMIC RANGE OF MOTOR OPERATION

(75) Inventors: David E. Howard, Hazel Green, AL (US); Dean C. Alhorn, Huntsville, AL (US); Dennis A. Smith, Athens, AL (US); Kenneth R. Dutton, Athens, AL (US); Mitchell Scott Paulson, Hunstville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 29 days.

(21) Appl. No.: 10/857,375

(22) Filed: May 21, 2004

(51) Int. Cl.
*G05B 5/01* (2006.01)
(52) U.S. Cl. .............. 318/632; 318/611; 318/616
(58) Field of Classification Search ............. None
See application file for complete search history.

(56) References Cited

U.S. PATENT DOCUMENTS

| | | | |
|---|---|---|---|
| 4,021,714 A | | 5/1977 | Jones et al. |
| 4,164,729 A | * | 8/1979 | Simon et al. ............ 341/116 |
| 4,267,497 A | | 5/1981 | Cannon et al. |
| 4,308,525 A | * | 12/1981 | Simon et al. ............ 341/113 |
| 4,310,878 A | | 1/1982 | Hyatt |
| 4,342,077 A | | 7/1982 | Passey et al. |
| 4,602,199 A | | 7/1986 | Walker |
| 4,652,806 A | | 3/1987 | Aiello |
| 4,823,062 A | | 4/1989 | Hoffman et al. |
| 4,935,684 A | | 6/1990 | Watanabe |
| 5,049,796 A | | 9/1991 | Seraji |
| 5,187,417 A | | 2/1993 | Minnich et al. |
| 5,194,796 A | | 3/1993 | Domeki et al. |
| 5,216,345 A | | 6/1993 | Eyerly |
| 5,260,631 A | * | 11/1993 | Hayashida et al. ......... 318/594 |

(Continued)

FOREIGN PATENT DOCUMENTS

JP 61030980 A 2/1986

(Continued)

OTHER PUBLICATIONS

Ukita, N., et al. "A High-Precision Angle Encoder for a 10-m Submillimeter Antenna." Publ. Natl. Astron. Obs. Japan, vol. 6, 59-62; 2001.*

(Continued)

*Primary Examiner*—Paul Ip
(74) *Attorney, Agent, or Firm*—James J. McGroary; Peter J. Van Bergen

(57) ABSTRACT

A motor controller system uses a rotary sensor with a plurality of signal conditioning units, coupled to the rotary sensor. Each of these units, which is associated with a particular range of motor output shaft rotation rates, generate a feedback signal indicative of the position of the motor's output shaft. A controller (i) converts a selected motor output shaft rotation rate to a corresponding incremental amount of rotational movement for a selected fixed time period, (ii) selects, at periodic completions of the selected fixed time period, the feedback signal from one of the signal conditioning units for which the particular range of motor output shaft rotation rates associated therewith encompasses the selected motor output shaft rotation rate, and (iii) generates a motor drive signal based on a difference between the incremental amount of rotational movement and the feedback signal from the selected one of the signal conditioning units.

18 Claims, 1 Drawing Sheet

U.S. PATENT DOCUMENTS

Figure 1:
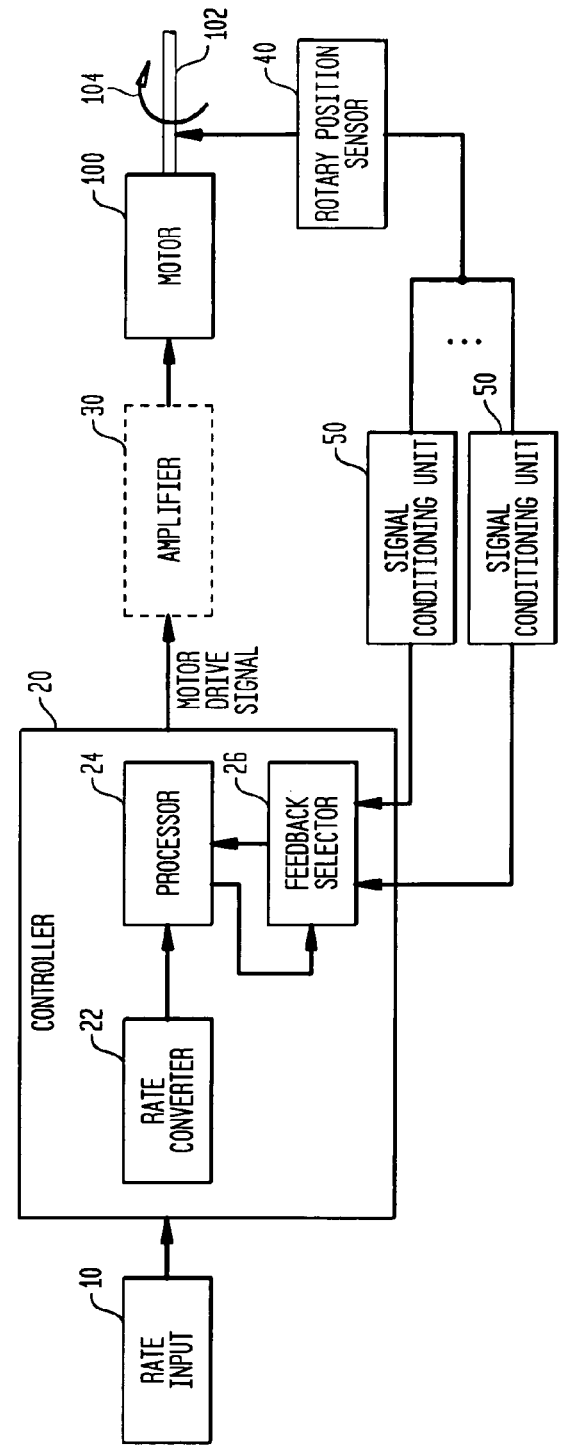

| | | | |
|---|---|---|---|
| 5,272,423 A | | 12/1993 | Kim |
| 5,392,207 A | | 2/1995 | Wilson et al. |
| 5,459,383 A | * | 10/1995 | Sidman et al. ............... 318/611 |
| 5,592,057 A | | 1/1997 | Kordik |
| 5,635,808 A | | 6/1997 | Roseliep |
| 5,932,986 A | * | 8/1999 | Henry et al. ................. 318/601 |
| 6,037,735 A | | 3/2000 | Janosky et al. |
| 6,140,793 A | | 10/2000 | Carr et al. |
| 6,445,961 B1 | | 9/2002 | Melvin |
| 6,643,606 B1 | * | 11/2003 | Kim ........................... 702/151 |
| 6,754,610 B1 | * | 6/2004 | Dudler et al. ................ 702/151 |
| 6,903,529 B1 | * | 6/2005 | Kunzel et al. ............... 318/611 |
| 2005/0057245 A1 | * | 3/2005 | Miya ..................... 324/207.25 |

FOREIGN PATENT DOCUMENTS

| | | |
|---|---|---|
| JP | 61201312 A2 | 9/1986 |
| JP | 62171486 A2 | 7/1987 |
| JP | 63028284 A2 | 2/1988 |
| JP | 63179259 A2 | 7/1988 |
| JP | 11271009 A2 | 10/1999 |
| JP | 2002101639 A2 | 4/2002 |

OTHER PUBLICATIONS

Tamagawa Seiki Co. LTD; Mitsubishi Electric Corp. "Ultra-Precise Angle Measuring Resolver System." Ohyasumi, IIDA, Nagano Pref, Japan; 2001.*

Analog Devices. "AD2S81A/AD2S82A: Variable Resolution, Monolithic Resolver-to-Digital Converters." One Technology Way, Norwood, MA; 1998.*

Analog Devices. "AD2S44: Low Cost, 14-Bit, Dual Channel Synchro/Resolver-to-Digital Converter." One Technology Way, Norwood, MA; 1989.*

* cited by examiner

MOTOR CONTROLLER SYSTEM FOR LARGE DYNAMIC RANGE OF MOTOR OPERATION

ORIGIN OF THE INVENTION

The invention was made in performance of work under a NASA contract and by employees of the United States Government and is subject to the provisions of Public Law 96-517 (35 U.S.C. §202) and may be manufactured and used by or for the Government of the United States of America for governmental purposes without the payment of any royalties thereon or therefor. In accordance with 35 U.S.C. §202, the Contractor has elected not to retain title.

BACKGROUND OF THE INVENTION

1. Field of the Invention

This invention relates to motor controllers. More specifically, the invention is a motor controller system that provides a large dynamic range of motor operation for a single motor.

2. Description of the Related Art

Many mechanical drive system applications (e.g., robotics, materials processing furnaces, medical scanning devices, telescope drives, solar array drives, etc.) require that motor rates (e.g., revolutions per minute) be controlled for both very slow rates of much less than one revolution per minute and very high rates of several thousand revolutions per minute. In order to meet these requirements, the prior art has generally utilized two motors with associated control electronics for each motor. Typically, a stepper motor driven through a speed reduction gear is used to satisfy slow motor rate requirements while a DC servo motor is used to satisfy high motor rate requirements. Unfortunately, there are numerous problems with these two-motor systems. For example, stepper motors inherently waste power, are not normally designed to operate at high speeds, and have resonant frequencies of operation that can induce vibrations in the system to which the stepper motor is coupled. Further, use of reduction gears adds complexity and disturbances to the overall mechanical drive system. Still further, two-motor mechanical drive systems must utilize a clutching mechanism to clutch the stepper motor out of the system when high motor rates are required. Finally, the two-motors and associated electronics, clutching mechanism/gears add weight, size and cost to the overall mechanical drive system.

SUMMARY OF THE INVENTION

Accordingly, it is an object of the present invention to provide a control system that can accurately control a single motor from very slow to very fast rates of rotation.

Other objects and advantages of the present invention will become more obvious hereinafter in the specification and drawings.

In accordance with the present invention, a motor controller system is provided and is adapted for use with a motor having a drive input and a rotating output shaft that rotates at a rate corresponding to the drive input. The motor controller system uses a rotary position sensor adapted to be coupled to the motor's output shaft. The rotary position sensor senses a rotational position of the output shaft and generates a position signal indicative thereof. Each of a plurality of signal conditioning units coupled to the rotary position sensor are associated with a particular range of motor output shaft rotation rates. Each of these units (i) monitors the position signal, and (ii) generates a feedback signal indicative of the rotational position of the motor's output shaft. A controller is coupled to the signal conditioning units and is further adapted to be coupled to the motor's drive input. The controller (i) converts a selected motor output shaft rotation rate to a corresponding incremental amount of rotational movement for a selected fixed time period, (ii) selects, at periodic completions of the selected fixed time period, the feedback signal from one of the signal conditioning units for which the particular range of motor output shaft rotation rates associated therewith encompasses the selected motor output shaft rotation rate, and (iii) generates a motor drive signal based on a difference between the incremental amount of rotational movement and the feedback signal from the selected one of the signal conditioning units. The generated motor drive signal is applied to the motor's drive input.

BRIEF DESCRIPTION OF THE DRAWING(S)

Figure 2:
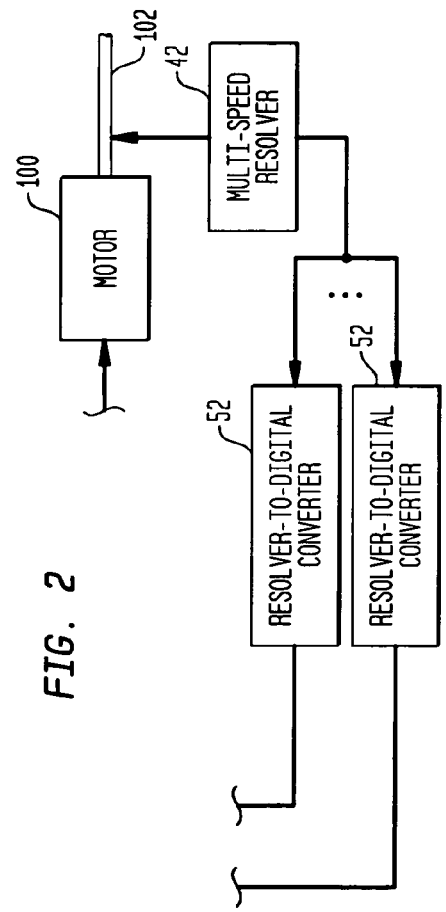

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a block diagram of a closed-loop motor control system for controlling a motor's rotation rate in accordance with the present invention; and FIG. 2 is an isolated view of motor position sensing and signal conditioning elements in accordance with a preferred embodiment of the present invention.

DESCRIPTION OF THE PREFERRED EMBODIMENT(S)

Referring now to the drawings, and more particularly to FIG. 1, a motor controller system according to the present invention is shown coupled to a motor 100. By way of illustrative example, motor 100 is a DC brushless servo motor although other motors such as a DC brush motor or AC induction motor could also be controlled by the present invention. As is known in the art, motor 100 has an output shaft 102 that rotates (as indicated by arrow 104) at a rate dictated by a drive signal supplied to motor 100. Although not shown, a device or system to be driven by output shaft 102 would be coupled thereto as is well known in the art. The present invention controls the motor's drive signal to thereby control the rotation rate of output shaft 102 from very slow rates of rotation (e.g., much less than one revolution per minute or RPM) to very fast rates of rotation (e.g., on the order of several thousand RPMs or more).

A selected rate of rotation (e.g., in RPM) for output shaft 102 is provided by a rate input device 10 which can range from a simple set of manually-operated selection switches to a computer that provides for the manual or automatic generation of a rate input. Accordingly, it is to be understood that the type and operation of rate input device 10 is not a limitation of the present invention. It is further to be understood that rotation input device 10 need not even be included in the present invention in situations where the present invention is being retro-fitted to an existing application.

The selected rotation for output shaft 102 is input to a controller 20, the functions of which can be implemented by means of a single processor or by individual components performing one or more functions of controller 20. By way of illustrative example, controller 20 is shown and will be described as having several functional components/blocks that cooperate to generate a motor drive signal at the output thereof. At this point in the description, it is sufficient to say that the motor drive signal output from controller 20 is used as the drive input for motor 100. If needed, the motor drive signal output from controller 20 can be boosted by an amplifier 30 (shown in dashed line form to indicate its optional nature). For example, if the generated motor drive signal is in the form of a current, amplifier 30 is a current amplifier.

A rotary position sensor 40 is "coupled" (e.g., mechanically, optically, electronically, etc.) to output shaft 102. Sensor 40 is any device capable of sensing a rotational position of output shaft 102 during rotation thereof. By way of illustrative example, sensor 40 can be a single or multi-speed resolver with a multi-speed resolver being preferred as it increases the resolution capability of the present invention as will be explained further below.

The rotational position output from sensor 40 is supplied to two or more signal conditioning units 50. In terms of the use of a resolver for sensor 40, the output therefrom is continuously supplied to signal conditioning units 50. Each of units 50 is associated with a range of rotation rates of output shaft 102 for specific application requirements of motor 100. For example, if motor 100 must operate from speeds ranging from 0.0001 RPM to 6000 RPM, one of units 50 could be associated with a very slow rotation range (e.g., 0.0001–2.5 RPM) while a second of units 50 could be associated with a faster rotation rate range (e.g., 2.5–6000 RPM). Additional units 50 could be used (if smaller rate ranges are desired) without departing from the scope of the present invention.

Each of units 50 converts the output of sensor 40 to digital steps or increments indicative of the position of output shaft 102 during each revolution thereof. The number of increments or resolution for each of units 50 is dependent on the rotation rate range associated with the particular one of units 50. For example, if the application requires a high degree of precision at the very slow rotation rates, a large number of position increments must be measurable by the combination of rotary position sensor 40 and the relevant one of signal conditioning units 50. Note that the resolution provided by this combination can be enhanced through the use of a multi-speed resolver for sensor 40. That is, the speed of the resolver (e.g., two-speed, four-speed, etc.) serves as multiplier for the incremental precision provided by each of units 50. The digital outputs from units 50 are continuously supplied to controller 20.

As mentioned above, controller 20 generates the motor drive signal used to drive motor 100. In general, controller 20 uses the selected rate of rotation provided by rate input device 10 and the output of one of units 50 to precisely and accurately generate the motor drive signal over the entire range of rotation rates for a given application of motor 100. More specifically, a rate converter 22 converts the selected rate of rotation (supplied by device 10) to a corresponding incremental amount of (rotational) movement of output shaft 102 for a selected time period or frequency. The corresponding incremental amount of movement should be a portion of one revolution of output shaft 102 while the fixed time period associated therewith is the time it takes for output shaft 102 to rotate that amount at the selected rate of rotation. Thus, the incremental amount of movement essentially equates to a position of output shaft 102 at the completion of each fixed time period.

A processor 24 uses the selected rate of rotation (or its corresponding incremental amount of movement) to select one output from signal conditioning units 50 by means of a feedback selector 26 (e.g., a hardware switch, a software "switch", etc.). More specifically, processor 24 operates to sample the digital position output from the one of units 50 at the completion of each time period associated with the incremental amount of movement generated by rate converter 22. The selected one of units 50 will have a range of rotation rates that includes or encompasses the selected rate of rotation provided by rate input device 10. Processor 24 then generates the motor drive signal based on the difference between (i) the "position" command for output shaft 102 (as required by the selected rate of rotation), and (ii) the actual position of output shaft 102 which is in the form of an incremental or digital position from the selected one of units 50. Ideally, this difference is zero. Therefore, processor 24 operates to reduce or minimize this difference as is known in the art of closed-loop feedback systems.

Referring now to FIG. 2, a preferred embodiment for output shaft position sensing and signal conditioning is shown in isolation. Specifically, the position of output shaft 102 is sensed continuously by a multi-speed resolver 42 and the signal conditioning is provided by a plurality of resolver-to-digital converters 52. Each of converters 52 can be configured for a particular range of rotation rates as described above.

The advantages of the present invention are numerous. A single motor is controlled precisely and accurately by simple electronics, i.e., a single rotational position sensor and multiple signal conditioning units with each unit being associated with a particular range of rotation rates. Control is provided over a wide dynamic range of rates thereby making the control system of the present invention useful for a variety of mechanical drive systems.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

The invention claimed is:

1. A motor controller system adapted for use with a motor having a drive input and a rotating output shaft wherein the output shaft rotates at a rate corresponding to the drive input, said motor controller system comprising:

converting means for converting a selected motor output shaft rotation rate to a corresponding incremental amount of movement for a fixed time period;

a rotary position sensor adapted to be coupled to the motor's output shaft, said rotary position sensor sensing a rotational position of the output shaft and generating a position signal indicative thereof;

a plurality of signal conditioning units coupled to said rotary position sensor, each of said plurality of signal conditioning units being associated with a particular range of motor output shaft rotation rates, each of said plurality of signal conditioning units (i) monitoring said position signal, and (ii) generating a feedback signal indicative of said rotational position of the motor's output shaft; and an error correction processor, coupled to said converting means and said plurality of signal conditioning units and further adapted to be coupled to the motor's drive input, for (i) selecting, at completion of each said fixed time period, said feedback signal from one of said plurality of signal conditioning units for which said particular range of motor output shaft rotation rates associated therewith encompasses said selected motor output shaft rotation rate, and (ii) generating a motor drive signal based on a difference between said incremental amount of movement and said feedback signal from said one of said plurality of signal conditioning units, wherein the motor drive signal is applied to the motor's drive input.

2. A motor controller system as in claim 1 wherein said rotary position sensor comprises a resolver.

3. A motor controller system as in claim 2 wherein each of said plurality of signal conditioning units comprises a resolver-to-digital converter coupled to said resolver for generating a digital representation of said position signal.

4. A motor controller system as in claim 1 wherein said rotary position sensor comprises a multi-speed resolver.

5. A motor controller system as in claim 4 wherein each of said plurality of signal conditioning units comprises a resolver-to-digital converter coupled to said multi-speed resolver for generating a digital representation of said position signal.

6. A motor controller system as in claim 1 further comprising means for supplying said selected motor output shaft rotation rate to said converting means.

7. A motor controller system adapted for use with a DC motor having a drive input and a rotating output shaft wherein the output shaft rotates at a rate corresponding to the drive input, said motor controller system comprising:
  converting means for converting a selected motor output shaft rotation rate to a corresponding incremental amount of rotational movement for a fixed time period, wherein said incremental amount of rotational movement is less than one revolution of the motor's output shaft;
  a rotary position sensor adapted to be coupled to the motor's output shaft, said rotary position sensor sensing a rotational position of the output shaft and generating a position signal indicative thereof;
  a plurality of signal conditioning units coupled to said rotary position sensor, each of said plurality of signal conditioning units being associated with a particular range of motor output shaft rotation rates, each of said plurality of signal conditioning units (i) monitoring said position signal, and (ii) generating a feedback signal indicative of said rotational position of the motor's output shaft;
  an error correction processor, coupled to said converting means and said plurality of signal conditioning units, for (i) selecting, at completion of each said fixed time period, said feedback signal from one of said plurality of signal conditioning units for which said particular range of motor output shaft rotation rates associated therewith encompasses said selected motor output shaft rotation rate, and (ii) generating a motor drive signal that minimizes a difference between said incremental amount of movement and said feedback signal from said one of said plurality of signal conditioning units; and
  an amplifier, coupled to said error correction processor and adapted to be coupled to the motor's drive input, for amplifying said motor drive signal wherein the motor drive signal is applied to the motor's drive input.

8. A motor controller system as in claim 7 wherein said rotary position sensor comprises a resolver.

9. A motor controller system as in claim 8 wherein each of said plurality of signal conditioning units comprises a resolver-to-digital converter coupled to said resolver for generating a digital representation of said position signal.

10. A motor controller system as in claim 7 wherein said rotary position sensor comprises a multi-speed resolver.

11. A motor controller system as in claim 10 wherein each of said plurality of signal conditioning units comprises a resolver-to-digital converter coupled to said multi-speed resolver for generating a digital representation of said position signal.

12. A motor controller system as in claim 7 further comprising means for supplying said selected motor output shaft rotation rate to said converting means.

13. A motor controller system adapted for use with a motor having a drive input and a rotating output shaft wherein the output shaft rotates at a rate corresponding to the drive input, said motor controller system comprising:
  a rotary position sensor adapted to be coupled to the motor's output shaft, said rotary position sensor sensing a rotational position of the output shaft and generating a position signal indicative of each said rotational position so-sensed;
  a plurality of signal conditioning units coupled to said rotary position sensor, each of said plurality of signal conditioning units being associated with a particular range of motor output shaft rotation rates, each of said plurality of signal conditioning units (i) monitoring said position signal, and (ii) generating a feedback signal indicative of said rotational position of the motor's output shaft; and
  a controller, coupled to said plurality of signal conditioning units and further adapted to be coupled to the motor's drive input, for (i) converting a selected motor output shaft rotation rate to a corresponding incremental amount of rotational movement for a selected fixed time period, (ii) selecting, at periodic completions of said selected fixed time period, said feedback signal from one of said plurality of signal conditioning units for which said particular range of motor output shaft rotation rates associated therewith encompasses said selected motor output shaft rotation rate, and (iii) generating a motor drive signal based on a difference between said incremental amount of rotational movement and said feedback signal from said one of said plurality of signal conditioning units, wherein the motor drive signal is applied to the motor's drive input.

14. A motor controller system as in claim 13 wherein said rotary position sensor comprises a resolver.

15. A motor controller system as in claim 14 wherein each of said plurality of signal conditioning units comprises a resolver-to-digital converter coupled to said resolver for generating a digital representation of said position signal.

16. A motor controller system as in claim 13 wherein said rotary position sensor comprises a multi-speed resolver.

17. A motor controller system as in claim 16 wherein each of said plurality of signal conditioning units comprises a resolver-to-digital converter coupled to said multi-speed resolver for generating a digital representation of said position signal.

18. A motor controller system as in claim 13 further comprising means for supplying said selected motor output shaft rotation rate to said controller.

* * * * *